March 24, 1964     R. M. MILLER     3,126,190
MAGNETIC LICENSE BRACKET
Filed June 19, 1961
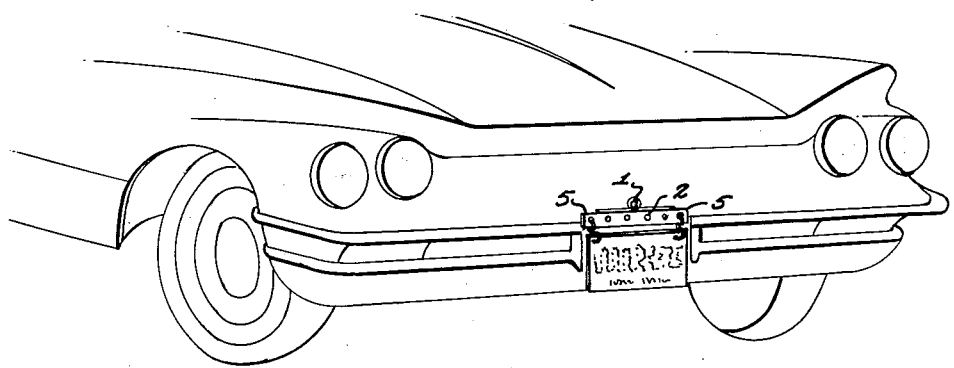
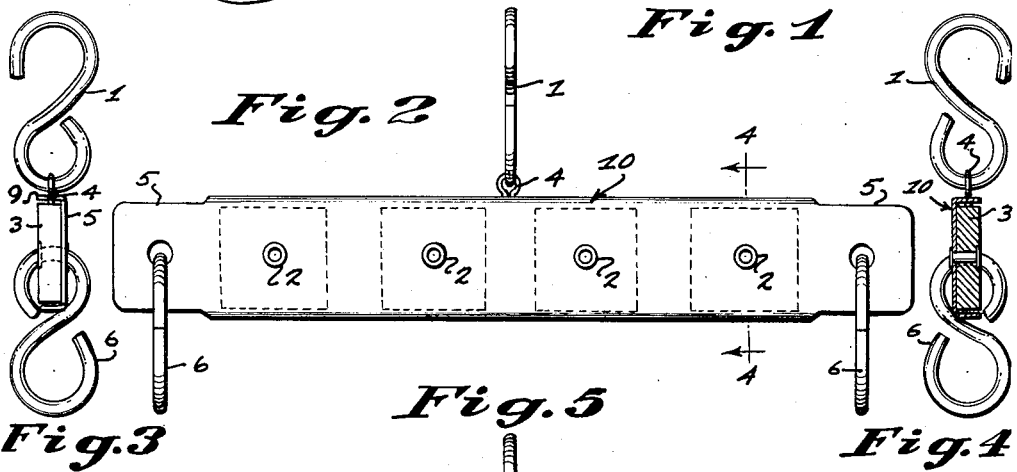
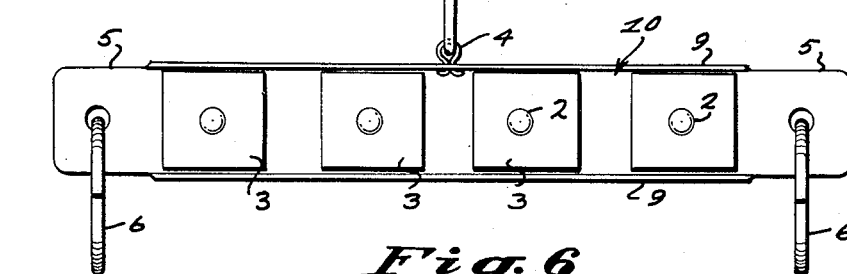
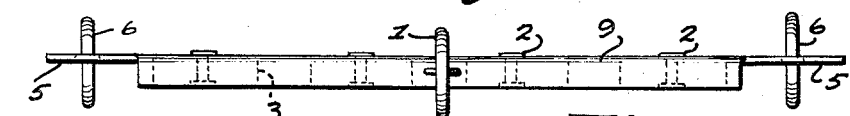
INVENTOR.
ROY M. MILLER
BY
ATTORNEY United States Patent Office 3,126,190
Patented Mar. 24, 1964

3,126,190
MAGNETIC LICENSE BRACKET
Roy M. Miller, Colorado Springs, Colo., assignor, by mesne assignments, to Emil Clark, El Paso County, Colo.
Filed June 19, 1961, Ser. No. 118,173
3 Claims. (Cl. 248—206)

The present invention relates broadly to the field of brackets and hangers, and more specifically to a combination hook and magnetic bracket for temporarily attaching license plates to automobiles.

Automobile dealers and sales people, in a majority of states, having long been burdened with the inconvenient and time consuming task of affixing their "dealer" license plates to transient vehicles while the vehicle is in their possession. More often than not, a dealer does not have a sufficient number of different license plates to cover all the automobile stock which he has on hand at one time and it therefore becomes necessary to constantly transfer a few license plates from one automobile to another.

Such transfer of license plates, with the presently available fastening devices, is annoying and time consuming and very often results in lost plates which become detached from the automobile and fall off during its travel.

It is thus the primary object of the present invention to facilitate and encourage the fast and effortless mounting and removal of automobile license plates for temporary purposes.

It is a second object of the invention to provide an inexpensive and easily fabricated license plate mounting bracket which is reliable and strong and insures against the loss of license plates.

A further object of the invention is to provide a device for temporarily mounting license plates on an automobile which will not mar the finish of the automobile and will easily accommodate any model or make of car or truck.

A still further object of the invention is to provide a fastening or hanging bracket which maintains a tight, secure fit to metal without the use of bolts or screws or similar fastening devices.

Other and still further objects, features and advantages will become apparent with the reading of the following detailed description of the invention taken in conjunction with the accompanying drawings.

In the drawings:

FIGURE 1 illustrates the bracket of the present invention as it would appear mounted on the front bumper of a vehicle while supporting a license plate thereon.

FIGURE 2 is a front view of the entire license bracket.

FIGURE 3 is an end view of the license bracket.

FIGURE 4 is a vertical cross-sectional view of the bracket taken along lines 4—4 in FIGURE 2.

FIGURE 5 is a rear view of the bracket showing a plurality of rectangular magnets mounted within the channel of the bracket frame.

FIGURE 6 is a top view of the bracket.

FIGURE 7 is the rear view, shown broken to conserve space, of a modification of the bracket of FIGURE 5, wherein the modification contains one elongated magnet in view of a plurality of magnets.

Briefly, the present invention comprises a rigid frame member having attached thereto some means for supporting in a depending relation, an object, like a license plate, and further including two means of support for attachment of the bracket frame to a relatively flat surface; these two means comprising a horizontal force clamping means and a vertical force hanger means.

Referring now to the specific embodiments of the invention, shown and illustrated in the drawings, the bracket is seen generally in FIGURES 2 and 5 showing front and rear views of the preferred embodiment of the bracket.

Forming the foundation of the bracket is a metal channel frame member 10, the channel portion being formed by oppositely disposed upstanding side flanges 9 which give the frame member rigidity and strength and also serve to partially enclose the rectangular shaped permanent magnets 3 which are equi-spaced within the channel and fastened thereto by rivets 2 or other convenient means.

Integral with the frame member 10 are two ears 5 protruding from each end of the frame. Each of the ears 5 is provided with a centrally located hole therethrough into which is inserted one loop end of an S-hook 6. The spacing between the holes in the ears is made such that the depending S-hooks are adapted to engage the mounting holes in the top of a license plate. The lower loop of each of the S-hooks 6 is inserted into the license plate mounting hole, thus suspending and supporting the license plate from the frame member 10.

Through a hole at the mid-point of the top flange 9 of the frame member 10 is inserted a spring wire eye 4 which engages the lower loop of a vertical supporting S-hook 1 and secures the hook to the frame member 10. The top loop of the supporting S-hook 1 is trained around the upper edge of an automobile bumper or similar member to provide vertical support and hanging means for the bracket.

When the magnets 3 disposed within the channel of the frame member 10 come into proximity with the bumper or other metallic surface, the forces of attraction between the magnets 3 and the bumper act to clamp the frame member securely to the bumper. However, after the automobile had been driven for some distance, the frame member would tend to slide down the bumper surface, if not prevented from so doing by the vertically supporting S-hook 1.

It is thus apparent that placing the bracket on or taking it off of a vehicle is simple and fast. The bracket also provides a tight clinging, solid, non-rattling holder for a temporary license plate which insures against dislodgement and loss of the plate.

A second embodiment of the invention is shown in FIGURE 7, employing one elongated magnet in place of the plurality of smaller magnets used in the first embodiment.

Having thus described my invention, what I desire to claim and secure by Letters Patent is:

1. A bracket for supporting and mounting a license plate to an automobile comprising in combination:
   a channeled frame member;
   a plurality of permanent magnets mounted to the said channeled frame member;
   a pair of S-hooks depending from the two ends of the channeled frame member; and
   an S-hook attached to the top edge portion of the channeled frame member at the mid-point thereof.

2. In a supporting bracket for license plates:
   a frame member;
   a plurality of permanent magnets mounted on said frame member, said magnets each having at least two flat parallel surfaces and one of said surfaces abutting the said frame member;
   a hanger means carried by said frame member for attaching a license plate to the said frame; and
   a vertical support means attached to said frame member for supporting the weight of the said frame and license plates.

3. A yoke type carrier adapted to be disposed against an inclined surface, comprising;
- a substantially horizontally disposed yoke frame;
- a hanger member attached to the yoke frame along its upper horizontal edge and midway between the ends thereof;
- a pair of supporting members carried by said frame along the lower horizontal edge thereof and disposed equidistant from the vertical center line of the frame; and
- means carried by the yoke frame providing a substantially horizontal clamping force between the frame member and the said inclined surface.

References Cited in the file of this patent

UNITED STATES PATENTS

| | | |
|---|---|---|
| 2,172,681 | Planks | Sept. 12, 1939 |
| 2,302,300 | Davies | Nov. 13, 1942 |
| 2,620,579 | Dienes | Dec. 9, 1952 |
| 2,775,832 | Vizza | Jan. 1, 1957 |
| 2,943,246 | Riordan | June 28, 1960 |

FOREIGN PATENTS

| | | |
|---|---|---|
| 1,119,019 | France | Mar. 26, 1956 |